United States Patent Office 3,523,157
Patented Aug. 4, 1970

3,523,157
CAST INSULATING BUSHING WITH AXIALLY DISPOSED ELECTRICAL CABLE
Raymond A. Bauer, Pittsburgh, Pa., and John G. Holmes, Cincinnati, Ohio, assignors to Allis-Chalmers Manufacturing Company, Milwaukee, Wis.
Filed Jan. 3, 1969, Ser. No. 788,765
Int. Cl. H01b 17/26
U.S. Cl. 174—142          4 Claims

ABSTRACT OF THE DISCLOSURE

An insulating bushing for submersible electrical apparatus which eliminates exposed high potential terminals and provides continuous, void-free dielectric insulation between bushing and the underground cable to the apparatus, has an insulated electrical cable with its conductor crimped to a connector stud embedded axially within a cylindrical body of castable resin and a metallic mounting member having a tubular portion surrounding the cable embedded in the resin and a circumferential flange extending outward from the cast body. In a high voltage embodiment, the cable has an outer semiconductive jacket, and the tubular portion of the mounting member electrically engages the semiconductive jacket and flares conically outward and forms a stress grading cone.

---

Figures 1, 2:
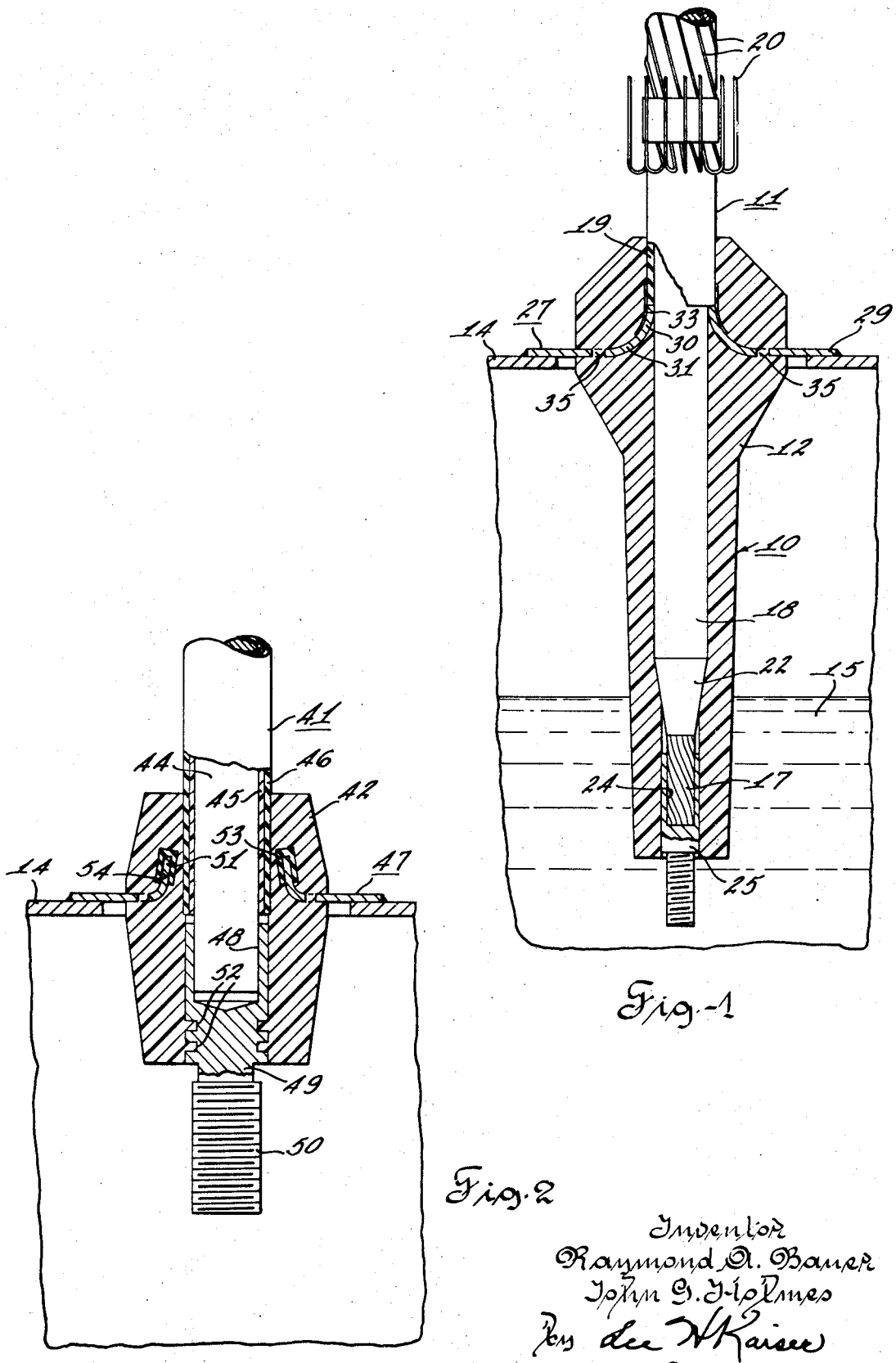

This invention relates to insulating bushings for electrical apparatus and more particularly to electrical insulating bushings molded of resinous material for stationary induction apparatus.

Conventional porcelain insulating bushings are unsatisfactory for submersible type electrical apparatus such as underground distribution transformers because they have metallic terminals exposed at high potential external of the transformer casing to which the power line cable is connected, and such exposed metallic terminals are a source of danger to the lineman and may form galvanic cells which erode the metallic connection to the power line conductor. Exposed bushing terminals must be insulated in the field to remove the hazard to the lineman, and this task is time-consuming and difficult to accomplish if the bushing is of the high voltage type. Further, porcelain fractures easily when subjected to shock or sharp blows, and it is frequently necessary to return the electrical apparatus to the manufacturer to replace a porcelain bushing broken during handling or shipping.

It is an object of the invention to provide an improved insulating bushing for submersible electrical apparatus which has continuous, void-free dielectric insulation between the bushing and the underground cable and eliminates metallic parts exposed externally of the apparatus casing. It is a further object to provide such an improved insulating bushing which is easily manufactured and can withstand substantially greater shocks and sharp blows without breaking than a conventional porcelain bushing.

It is an object of a preferred embodiment to provide such an improved insulating bushing for high voltage electrical apparatus which has means for distributing the electrical stress.

These and other objects and advantages of the invention will be more readily apparent from the following detailed description when considered in conjunction with the accompanying drawing wherein:

FIG. 1 is a sectional view through a high voltage insulating bushing embodying the present invention; and FIG. 2 is a sectional view through a low voltage insulating bushing embodying the invention.

Referring to FIG. 1 of the drawing, an insulating bushing 10 embodying the invention for high voltage electrical apparatus has a length of commercially available primary electrical underground cable 11 embedded axially within a generally cylindrical body portion 12 of cast resinous material, preferably a suitable thermosetting resin such as an epoxy resin. Bushing 10 may protrude through an aperture in the wall 14 of the metallic casing of a submersible, or underground distribution transformer (not shown) so that one end of bushing 10 is immersed in transformer oil 15 within the casing. Primary cable 11 may be of the type intended for primary underground distribution and may have a central stranded copper or aluminum conductor 17 surrounded successively by a layer 18 of suitable insulation, e.g., polyethylene or butyl rubber such as neoprene, a relatively thin jacket 19 of semiconductive material such as extruded semiconducting polyethylene, and an outer layer of helically wound, bare tinned copper wires 20 termed the concentric neutral, or ground shield. The ground shield wires 20 are folded back exterior of the cast body portion 12. Prior to being cast in body portion 12, the semiconductive layer 19 is removed for a predetermined distance from the end of the conductor 17 dependent upon the voltage class, for example seven inches if the cable 11 is of the 15 kilovolt class. The insulation layer 18 is removed prior to casting for a predetermined distance from the end of the conductor 17 and the end of the insulation layer 18 is penciled, i.e., cut in conical shape at 22 to provide a smooth surface. Prior to casting the exposed conductor 17 is inserted into and crimped within the axial bore 24 in a copper connector rod 25 having external threads extending from the lower end of body portion 12 to which a conductor (not shown) from the transformer primary winding may be connected.

A metallic, bushing mounting member 27, preferably of stainless steel, is embedded within cast body portion 12 and has a circumferential flange 29 exterior of body portion 12 and a central tubular portion 30 which surrounds cable insulation 18 and is of the same diameter as and abuts against the end of semiconductive jacket 19. Tubular portion 30 flares outward gradually to form a conical portion 31 which merges into flange 29. Semiconductive tape 33 overlaps and electrically connects semiconductive jacket 19 to tubular portion 30, and the gradually flaring conical portion 31 forms a stress grading cone which eliminates a high voltage gradient at the end of semiconductive jacket 19. If stress grading means were not provided, the lines of electrical force between the cable conductor 17 (which may be at 15,000 volts) and the grounded semiconductive jacket 19 would all tend to concentrate at the end of semiconductive jacket 19 and create a high voltage gradient at this point. Conical portion 31 spreads such lines of elecrical force apart and thus prevents a high voltage gradient at the end of semiconductive jacket 19.

Bushing mounting member 27 may be shot blasted and perforations 35 may be provided therein to assure good adherence of the resin to the stainless steel material. Flange 29 overlaps and is welded around its entire periphery to the wall 14 of the transformer casing. The stainless steel material has high resistance to corrosion and weathering and also has relatively low heat conductivity which facilitates welding to wall 14 by minimizing heat transfer during the welding operation.

Bushing 10 may be constructed by disposing cable 11 and mounting member 27 in a fixed position in a suitable mold (not shown) and so prepared prior to casting that cable conductor 17 is crimped to connector 25 and tubular portion 30 surrounds insulation 11 and abuts against semiconductive jacket 19, and by pouring a liquid resinous mixture into the mold. The resinous mixture may then be cured and the mold removed so that it may be used again.

Alternatively body portion 12 may be formed by pressure or injection molding.

The cable 11 forms the axial conductor for the insulating bushing by which the electrical apparatus is electrically connected to the power system. The disclosed cast insulating bushing provides continuous, void-free dielectric insulation between bushing and the underground cable and eliminates metallic parts exposed at high potential which are a hazard to the lineman and might form electrolytic cells in a submersible location that could erode the electrical connection. Further, the disclosed cast bushings are easily manufactured and have greater ability to withstand shock and sharp blows without fracturing than porcelain bushings.

The low voltage bushing embodiment of the invention illustrated in FIG. 2 does not require stress grading means and may have a length of commerically available secondary electrical underground cable 41 embedded axially within a generally cylindrical body portion 42 of a castable thermosetting material such as a resinous polymeric epoxide. Cable 41 may have a central stranded copper or aluminum conductor 44 surrounded by a concentric inner polyethylene layer 45 and a concentric outer jacket 46 of suitable insulating material e.g., butyl rubber such as neoprene. Prior to casting the insulation layers 45 and 46 may be removed for a predetermined distance and the conductor 44 inserted into and crimped within the axial bore 48 in a copper connector stud 49 having external threads 50 exterior of body portion 42 for connection to a lead from the transformer secondary winding (not shown). Circumferential grooves 52 may be provided in connector stud 49 to improve adherence to resin body 42 and to prevent oil from creeping up between the copper connector stud 49 and the cast resin of body portion 42.

A stainless steel bushing-mounting member 47 is similar to member 27 of the FIG. 1 embodiment and has a central tubular portion 51 embedded in cast body portion 42 in surrounding, but spaced relation to cable 41. A ring 53 of resilient material such as rubber having a U-shaped cross section defining a circumferential groove 54 is fitted over the end of tubular portion 51 prior to casting and bonded thereto by a suitable thermosetting and oil-resistant adhesive such as epoxy cement. Resilient member 53 reduces the stresses in the resin adjacent the edges of tubular portion 51 during curing, and it also acts as an O-ring gasket which prevents creepage of transformer oil around the edge of bushing mounting member 41 and minimizes air pockets and corona by filling any crevice and shrinkage voids that may form in the cast resin during curing.

It should be understood that we do not intend to be limited to the particular embodiments shown and described, for many modifications and variations will be obvious to those skilled in the art.

The embodiments of the invention in which an exclusive property or privilege is claimed are defined as follows:

1. In combination with an electrical apparatus provided with a metallic casing having an aperture therethrough, an electrical insulating bushing extending through said aperture and including an electrical cable exterior of said casing having a metallic conductor surrounded by insulation,
   a metallic connector joined to said conductor and being accessible at the interior of said casing,
   a substantially cylindrical body member formed of a castable electrical insulating material surrounding said insulation of a length of said cable and the joined together portions of said conductor and said connector, and
   a bushing mounting member of low thermal conductivity stainless steel having a central tubular portion coaxial with and embedded in said body member in surrounding relation to said cable and being of larger diameter than and spaced from said cable and also having a flange extending radially outward from and surrounding said body member and being welded to said casing adjacent the margin of said aperture, and an annular resilient member of U-shaped cross section having a circumferential groove receiving the end of said tubular portion and being bonded thereto by a thermosetting and oil resistant adhesive and also being embedded within said body member and preventing leakage around said end of said tubular portion, said cable so surrounded by insulation at the exterior of said casing and embedded in said body member providing continuous insulation and eliminating exposed metal parts at the junction between cable and casing.

2. In combination with an electrical apparatus provided with a metallic casing having an aperture therethrough, an electrical insulating bushing extending through said aperture and including an electric cable having a metallic conductor surrounded by insulation and a semiconductive jacket surrounding said insulation and terminating in axially spaced relation from the end of said insulation,
   a metallic connector joined to said conductor,
   a substantially cylindrical body member formed of a castable electrical insulating material surrounding said semiconductive jacket of a length of said cable and surrounding said insulation adjacent the termination thereof and also surrounding the joined together portions of said conductor and said connector, and
   a metallic bushing mounting member having a central conical tubular portion coaxial with and embedded in said body member and gradually tapering outward and electrically engaging said semiconductive jacket and forming a stress grading cone for said cable and also having a flange extending radially outward from and surrounding said body member and being welded to said casing adjacent the margin of said aperture.

3. In the combination of claim 2 wherein said bushing mounting member is of stainless steel.

4. In the combination of claim 3 wherein the end of said insulation embedded within said body member is conical and smooth with the smallest diameter portion thereof adjacent said joined together portions of said conductor and said connector, said connector has an axial bore and said conductor is disposed and crimped within said axial bore.

References Cited
UNITED STATES PATENTS

| | | |
|---|---|---|
| 3,219,753 | 11/1965 | Vassos. |
| 3,388,212 | 6/1968 | Nichols et al. _____ 174—153 |
| 3,422,392 | 1/1969 | Woods _____ 174—152 X |
| 2,379,942 | 7/1945 | Webber _____ 174—73 X |
| 3,018,318 | 1/1962 | Franklin _____ 174—73 |
| 3,318,995 | 5/1967 | Buckley et al. _____ 174—142 |
| 3,348,180 | 10/1967 | Leonard et al. _____ 174—152 X |

FOREIGN PATENTS

| | | |
|---|---|---|
| 1,079,048 | 5/1954 | France. |
| 893,827 | 4/1962 | Great Britain. |

LARAMIE E. ASKIN, Primary Examiner

U.S. Cl. X.R.

174—73, 152